(12) United States Patent
Sun et al.

(10) Patent No.: US 12,440,981 B2
(45) Date of Patent: Oct. 14, 2025

(54) ROBOT CONTROL METHOD, ROBOT AND STORAGE MEDIUM

(71) Applicant: Beijing Xiaomi Robot Technology Co., Ltd., Beijing (CN)

(72) Inventors: Guokang Sun, Beijing (CN); Sheng Cao, Beijing (CN); Quanbin Xin, Beijing (CN); Yinghao Gao, Beijing (CN); Zebang Zhang, Beijing (CN); Zeyu Ren, Beijing (CN); Chenguang Sun, Beijing (CN); Jiajun Zhang, Beijing (CN); Wenping Guo, Beijing (CN); Diyun Xiang, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 188 days.

(21) Appl. No.: 18/201,690

(22) Filed: May 24, 2023

(65) Prior Publication Data
US 2024/0217101 A1 Jul. 4, 2024

(30) Foreign Application Priority Data
Dec. 26, 2022 (CN) .......................... 202211678711.5

(51) Int. Cl.
*B25J 9/16* (2006.01)
*B25J 11/00* (2006.01)

(52) U.S. Cl.
CPC ........... *B25J 9/1664* (2013.01); *B25J 11/004* (2013.01)

(58) Field of Classification Search
CPC .............................. B25J 9/1664; B25J 11/004
See application file for complete search history.

(56) References Cited

U.S. PATENT DOCUMENTS

| | | | |
|---|---|---|---|
| 2006/0090633 A1* | 5/2006 | Muramatsu | G10H 1/34 84/723 |
| 2007/0010913 A1* | 1/2007 | Miyamoto | B25J 9/1658 700/264 |
| 2017/0172671 A1* | 6/2017 | Miller | A61B 34/30 |
| 2018/0326588 A1* | 11/2018 | Van Rooyen | B25J 11/004 |
| 2019/0152061 A1* | 5/2019 | Xiong | B25J 9/1628 |
| 2019/0248008 A1* | 8/2019 | Noro | G05B 19/416 |
| 2023/0249333 A1* | 8/2023 | Kitano | G06F 3/0486 700/264 |

FOREIGN PATENT DOCUMENTS

| | | |
|---|---|---|
| CN | 113386157 A | 9/2021 |
| DE | 102017216093 B4 | 5/2019 |

OTHER PUBLICATIONS

Development_of_a_mini-humanoid_pianist (Year: 2010).*

(Continued)

*Primary Examiner* — Mohamad O El Sayah
(74) *Attorney, Agent, or Firm* — Cozen O'Connor

(57) ABSTRACT

A robot control method includes obtaining relevant parameters at a moment when the robot beats the musical instrument, calculating a motion trajectory of an end of a limb of the robot in a beating action period, and obtaining a joint control quantity of the corresponding limb of the robot, so that the robot beats the musical instrument according to the joint control quantity, and a beating action is corrected according to a correction parameter input by a user until the performance effect of the robot meets the requirements.

16 Claims, 3 Drawing Sheets

(56) References Cited

OTHER PUBLICATIONS

Development_of_anthropomorphic_musical_performance_robots(Year: 2009).*
European Patent Application No. 23176126.3, Search and Opinion Action dated Nov. 29, 2023, 16 pages.
Sun, T. et al. "Calibration for Precision Kinematic Control of an Articulated Serial Robot" IEEE Transactions on Industrial Electronics, vol. 68, No. 7, Jul. 2021, pp. 6000-6009.
Maier, D. et al. "Using Visual and Auditory Feedback for Instrument-Playing Humanoids" 2014 IEEE-RAS International Conference on Humanoid Robots, Madrid, Spain, Nov. 2014, pp. 944-950.

* cited by examiner

ROBOT CONTROL METHOD, ROBOT AND STORAGE MEDIUM

CROSS-REFERENCE TO RELATED APPLICATION

This application is based on and claims priority to Chinese Patent Application No. 202211678711.5 filed on Dec. 26, 2022, the entire contents of which are incorporated herein by reference for all purposes.

BACKGROUND

At present, robots are being developed that can play musical instruments. Some robots have been able to achieve a performance effect by beating musical instruments. For example, some humanoid robots can control and play complex percussion instruments such as a drum set. However, when some aspect of the robots and the musical instruments changes, such as moving to a different venue, moving the robot and/or the musical instrument, or debugging and maintaining them, the relative positions of the limbs of the robots and the musical instruments usually will change, which affects the subsequent performance effect.

SUMMARY

The present disclosure relates to a field of robots, and more particularly to a robot control method, a robot and a storage medium.

According to embodiments of a first aspect of the present disclosure, there is provided a robot control method, a robot achieves a performing effect by beating a musical instrument through limbs movements, and the method includes: obtaining a beaten position of the musical instrument and a joint configuration parameter of a limb of the robot at a moment when the robot beats the musical instrument; determining a motion trajectory of an end of the limb of the robot in a beating action period according to the beaten position of the musical instrument, a preset contact speed between the robot and the musical instrument, the beating action period of the robot, a position of the end of the limb of the robot at a starting moment of the beating action period and a special position of a beating action; generating a joint control quantity of the limb of the robot in the beating action period according to the motion trajectory of the end of the limb of the robot and the joint configuration parameter of the limb of the robot at the moment when the robot beats the musical instrument, and controlling the robot to beat the musical instrument according to the joint control quantity; and in response to determining that a correction parameter sent by a user is received, adjusting the preset contact speed between the robot and the musical instrument and/or the special position of the beating action according to the correction parameter, to update the joint control quantity, and controlling the robot to beat the musical instrument according to the updated joint control quantity.

According to embodiments of a second aspect of the present disclosure, there is provided a robot, and the robot includes: a memory for storing instructions executable by a processor; and a processor configured to: obtain a beaten position of the musical instrument and a joint configuration parameter of a limb of the robot at a moment when the robot beats the musical instrument; determine a motion trajectory of an end of the limb of the robot in a beating action period according to the beaten position of the musical instrument, a preset contact speed between the robot and the musical instrument, the beating action period of the robot, a position of the end of the limb of the robot at a starting moment of the beating action period and a special position of a beating action; generate a joint control quantity of the limb of the robot in the beating action period according to the motion trajectory of the end of the limb of the robot and the joint configuration parameter of the limb of the robot at the moment when the robot beats the musical instrument, and control the robot to beat the musical instrument according to the joint control quantity; and in response to determining that a correction parameter sent by a user is received, adjust the preset contact speed between the robot and the musical instrument and/or the special position of the beating action according to the correction parameter, to update the joint control quantity, and control the robot to beat the musical instrument according to the updated joint control quantity.

According to embodiments of a third aspect of the present disclosure, a non-transitory computer-readable storage medium is provided, on which a computer program is stored. When executed by a processor, the computer program is configured to implement: obtaining a beaten position of the musical instrument and a joint configuration parameter of a limb of the robot at a moment when the robot beats the musical instrument; determining a motion trajectory of an end of the limb of the robot in a beating action period according to the beaten position of the musical instrument, a preset contact speed between the robot and the musical instrument, the beating action period of the robot, a position of the end of the limb of the robot at a starting moment of the beating action period and a special position of a beating action; generating a joint control quantity of the limb of the robot in the beating action period according to the motion trajectory of the end of the limb of the robot and the joint configuration parameter of the limb of the robot at the moment when the robot beats the musical instrument, and controlling the robot to beat the musical instrument according to the joint control quantity; and in response to determining that a correction parameter sent by a user is received, adjusting the preset contact speed between the robot and the musical instrument and/or the special position of the beating action according to the correction parameter, to update the joint control quantity, and controlling the robot to beat the musical instrument according to the updated joint control quantity.

It is to be understood that both the foregoing general description and the following detailed description are illustrative and explanatory only and are not intended to limit the present disclosure.

BRIEF DESCRIPTION OF DRAWINGS

The accompany drawings herein which are incorporated in and constitute a part of the present disclosure, illustrate embodiments consistent with the present disclosure and together with the description, serve to explain the principles of the present disclosure.

DETAILED DESCRIPTION

Here, illustrative embodiments will be described in detail, examples of which are shown in the accompanying drawings. When the following description refers to the drawings, unless otherwise specified, the same numbers in different drawings indicate the same or similar elements. The implementations described in the following illustrative embodiments do not represent all the embodiments consistent with the present disclosure. Rather, they are merely examples of devices and methods consistent with some aspects of the present disclosure as detailed in the appended claims.

The terms used in the present disclosure are for the purpose of describing specific embodiments only and are not intended to limit the present disclosure. The singular forms "a", "said" and "the" used in the present disclosure and the appended claims are also intended to include the plural forms, unless clearly otherwise specified in the context. It should also be understood that the term "and/or" as used herein refers to and includes any or all possible combinations of one or more associated listed items.

It should be understood that terms such as "first", "second" and "third" may be used herein for describing various pieces of information, but such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein may be interpreted as "while" or "when" or "in response to determining".

At present, performance robots are developing rapidly, and some robots have been able to achieve the performance effect by beating musical instruments. For example, some humanoid robots can control and play complex percussion instruments such as a drum set. However, due to the lack of effective robot calibration methods, when the robots and the musical instruments change their performance venues or are debugged and maintained, the relative positions of the limbs of the robots and the musical instruments usually will change and are difficult to recover, which affects the subsequent performance effect.

In view of this, the present disclosure provides a robot control method to at least solve the problems existing in the related art.

The method described in the present disclosure is applied to the robot, and the robot can achieve the performing effect by beating the musical instrument through limb movements. For example, the humanoid robot can achieve the performance of the drum set by beating the percussion instruments with holding drumsticks in hands, or by pedaling with their feet to drive the drumsticks to beat the percussion instruments.

Figure 1:
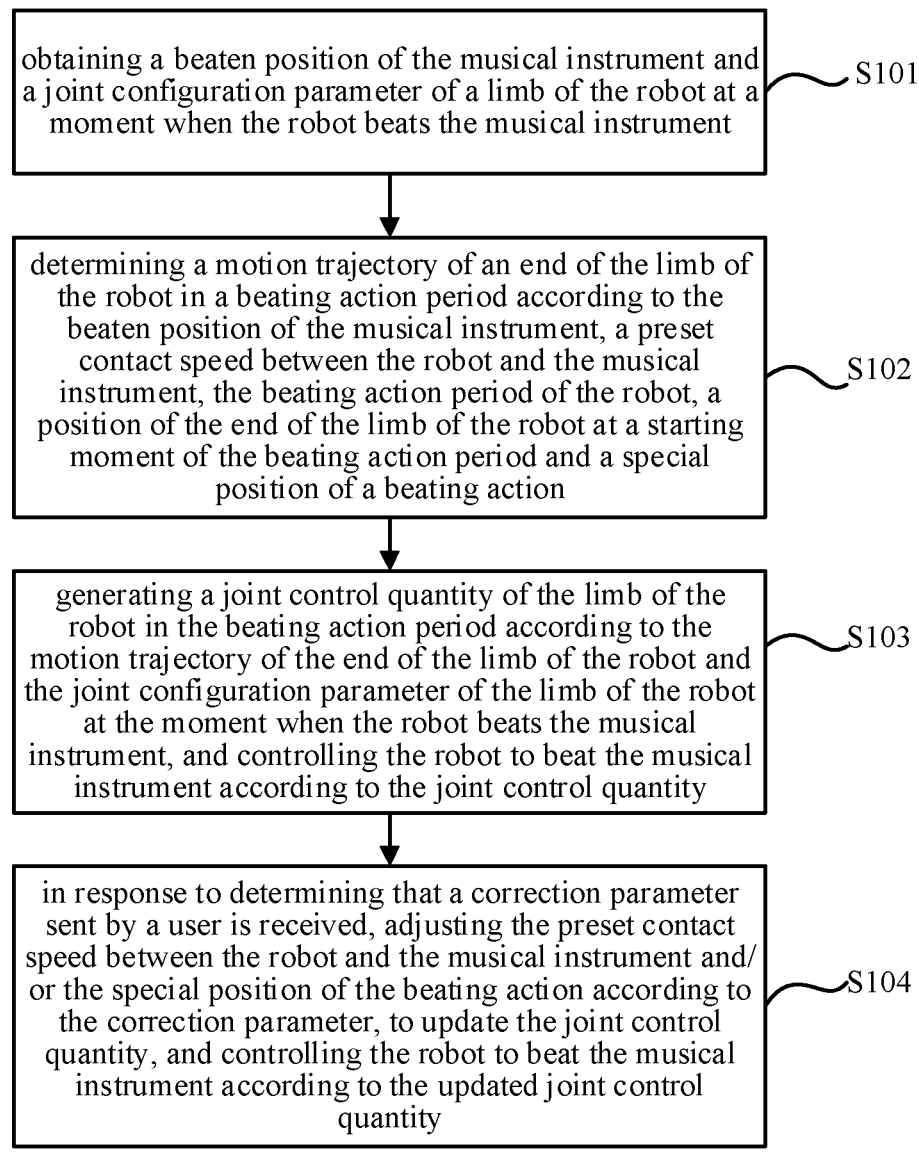
FIG. 1 is a flow chart of a robot control method according to an illustrative embodiment of the present disclosure.

FIG. 1 shows a flow chart of a robot control method according to an illustrative embodiment of the present disclosure.

At step S101, a beaten position of a musical instrument and a joint configuration parameter of a limb of a robot are obtained at a moment when the robot beats the musical instrument.

First, the staff can drag the limb of the robot used to beat the musical instrument to the beaten position, i.e. a position where the limb of the robot is in contact with the musical instrument during the performance, such as a position where the robot beats a drum surface with holding a drumstick in hands. The beaten position of the musical instrument, i.e. a spatial coordinate of a contact point between the musical instrument and the limb of the robot, such as a coordinate of an end of the drumstick at a current moment or a coordinate of a beaten point of the musical instrument, which can be calculated based on a current joint angle of the robot in combination with the forward kinematics equation.

The joint configuration parameter is used to represent a joint state of the limb of the robot at the moment when the limb of the robot is in contact with the musical instrument, and can be determined according to a collected value of a robot joint position sensor. In some embodiments, an average value of the joint configuration parameters of the limb of the robot collected by a motion sensor (such as the robot joint position sensor) within a preset duration can be determined as the joint configuration parameter of the limb of the robot. For example, the average value of the joint configuration parameters within 15 seconds is continuously obtained, so as to reduce the error influence of the sensor noise on the collection result.

Further, it can be manually confirmed whether the currently obtained joint configuration parameter is in a preset reasonable range. If it is in the preset reasonable range, subsequent correction processing will be carried out, and if it is not in the preset reasonable range, the limb of the robot can be dragged again for re-correction.

At step S102, a motion trajectory of an end of the limb of the robot in a beating action period is determined, according to the beaten position of the musical instrument, a preset contact speed between the robot and the musical instrument, a beating action period of the robot, a position of the end of the limb of the robot at a starting moment of the beating action period and a special position of a beating action.

The contact speed between the robot and the musical instrument represents a speed of the end of the limb of the robot, such as a speed of an end of the drumstick, when the limb of the robot beats the musical instrument. The beating action period of the robot is the time required for the robot to complete one beating action, and can be determined according to a tempo of a music to be played. The position of the end of the limb of the robot at the starting moment of the beating action period is a spatial coordinate of the end of the limb of the robot at the starting moment of each beating action period, such as a coordinate of an end of the drumstick. The position of the end of the limb of the robot at the starting moment of the beating action period can also be interpreted as a position of the beating action at the starting moment of the beating action period, because the beating action is executed by the end of the limb of the robot. The special position of the beating action can be selected according to the actual demand. Taking a case that the robot beats the percussion instrument with holding the drumstick in hands as an example, a highest point of a trajectory of the end of the drumstick can be taken as the special position of the beating action, which can be obtained by moving the position of the end of the limb of the robot at the starting moment of the beating action period upwards by a certain distance. The special position of the beating action can also be interpreted as a special position of the end of the limb of the robot in the beating action period.

Figure 2:
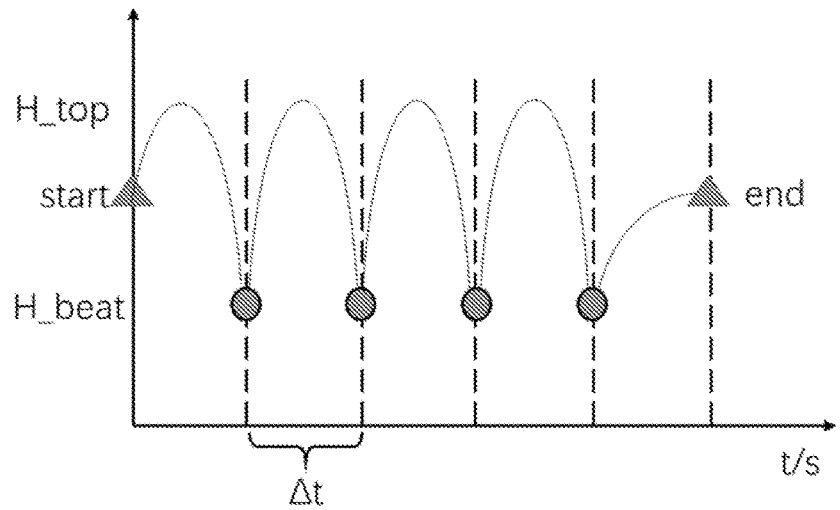
FIG. 2 is a schematic view of a motion trajectory of an end of a limb of a robot according to an illustrative embodiment of the present disclosure.

As shown in FIG. 2, in one beating action period ($\Delta t$), the end of the limb of the robot moves from the position (start) at the starting moment of the beating action period to the special position (H_top) of the beating action, then is contact with the musical instrument at the beaten position (H_beat) at the preset contact speed between the robot and the musical instrument, and finally returns to the position (start) at the starting moment of the beating action period.

For example, the motion trajectory of the end of the limb of the robot in the beating action period can be determined according to a polynomial interpolation function.

First, as shown in Formula (1), a position control quantity of the end of the limb of the robot in the beating action period can be determined based on a first polynomial interpolation function.

$$x_{cmd} = a_3 * t^3 + a_2 * t^2 + a_1 * t + a_0 \quad (1)$$

Then, as shown in Formula (2), a speed control quantity of the end of the limb of the robot in the beating action period can be determined based on a second polynomial interpolation function.

$$v_{cmd} = 3 * a_3 * t^2 + 2 * a_2 * t + a_1 \quad (2)$$

In an example, by making polynomial coefficients $a_0$, $a_1$, $a_2$ and $a_3$ satisfy the following relationship, specific numerical values of the polynomial coefficients can be determined:

$$x_{cmd(t1)} = x_{ready} \quad (3)$$

In Formula (3), t1 represents the starting moment of the beating action period, and $x_{ready}$ represents the position of the end of the limb of the robot at the starting moment of the beating action period, i.e., at the starting moment of the beating action period, the end of the limb of the robot is in a position of the beating action at the starting moment of the beating action period.

$$x_{cmd\left(t1+\frac{\Delta t}{2}\right)} = x_{top} \quad (4)$$

In Formula (4), $$t1 + \frac{\Delta t}{2}$$

represents a middle moment of the beating action period, and $x_{top}$ represents the special position of the beating action, i.e., at the middle moment of the beating action period, the end of the limb of the robot is in the special position of the beating action.

$$x_{cmd(t2)} = x_{ref} \quad (5)$$

In Formula (5), t2 represents an ending moment of the beating action period, and $x_{ref}$ represents the beaten position of the musical instrument, i.e., at the ending moment of the beating action period, the end of the limb of the robot is in the beaten position of the musical instrument.

$$v_{cmd(t1)} = -v_{beat} \quad (6)$$

In Formula (6), $v_{beat}$ represents the contact speed between the robot and the musical instrument.

$$v_{cmd\left(t1+\frac{\Delta t}{2}\right)} = 0 \quad (7)$$

Formula (7) represents that at the middle moment of the beating action period, the speed of the end of the limb of the robot is 0.

$$v_{cmd(t2)} = v_{beat} \quad (8)$$

Formula (8) represents that at the ending moment of the beating action period, the speed of the end of the limb of the robot is the contact speed between the robot and the musical instrument.

After determining the polynomial coefficients of the polynomial interpolation function, the position control quantity of the end of the limb of the robot and the speed control quantity of the end of the limb of the robot can be obtained, i.e., the motion trajectory of the end of the limb of the robot in the beating action period of the robot is obtained.

At step S103, a joint control quantity of the limb of the robot in the beating action period of the robot is generated according to the motion trajectory of the end of the limb of the robot and the joint configuration parameter of the limb of the robot at the moment when the robot beats the musical instrument, and the robot is controlled to beat the musical instrument according to the joint control quantity.

Specifically, according to the Jacobian matrix, the motion trajectory of the end of the limb of the robot can be transformed into the joint configuration parameter of the limb of the robot at the moment when the robot beats the musical instrument, as shown in Formula (9):

$$q_{cmd} = \int (J^+ * v_{cmd}) + N * q_{ref} \quad (9)$$

In Formula (9), $q_{cmd}$ represents the joint control quantity of the limb of the robot, $J^+$ represents an inverse matrix of the Jacobian matrix of the robot, N represents a null-space matrix of the Jacobian matrix of the robot, and $q_{ref}$ represents the joint configuration parameter of the limb of the robot at the moment when the robot beats the musical instrument.

After obtaining the joint control quantity of the limb of the robot in the beating action period, the robot can be controlled to beat the musical instrument according to the joint control quantity.

At step S104, in response to determining that a correction parameter sent by a user is received, the preset contact speed between the robot and the musical instrument and/or the special position of the beating action are adjusted according to the correction parameter to update the joint control quantity, and the robot is controlled to beat the musical instrument according to the updated joint control quantity until a correction ending instruction sent by the user is received.

In the process of the robot beating the musical instrument according to the joint control quantity, the user can confirm whether it is necessary to correct the limb movement of the robot according to the current performance effect of the robot, so as to make the performance effect more perfect.

In some embodiments, the user can send the correction parameter to a processor of the robot, and the performance effect of the robot can be improved by adjusting the preset contact speed between the robot and the musical instrument and/or the special position of the beating action. Taking the case that the robot beats the percussion instrument with holding the drumstick in hands as an example, if the user wants to increase the beating loudness of the percussion instrument, the contact speed between the robot and the musical instrument can be increased, and if the user wants to increase the action range of the robot during the beating process, the special position of the beating action can be increased (for example, the robot lifts the position of the end of the drumstick).

Then, the joint control quantity can be updated, and the robot can be controlled to beat the musical instrument according to the updated joint control quantity. If the user considers that the correction is completed, the correction ending instruction can be sent to make the robot terminate the correction process.

According to the method in the present disclosure, the motion trajectory of the end of the limb of the robot in the beating action period is calculated, and the corresponding joint control quantity of the limb of the robot is obtained, so that the robot can beat the musical instrument according to the joint control quantity, and the beating action can be corrected according to the correction parameter input by the user until the performance effect of the robot meets the requirements. According to the present disclosure, the robot can be quickly debugged and deployed in different occasions, and the influence of the change of the relative position between the limb of the robot and the musical instrument on the performance effect is avoided. Moreover, the position correction of the robot and the musical instrument can be completed without adding additional sensors, so that the correction cost is reduced. In addition, the correction can be performed at any time without rewriting codes.

In an embodiment, each musical instrument and each limb of the robot are provided with a preset number, and obtaining the beaten position of the musical instrument and the joint configuration parameter of the limb of the robot at the moment when the robot beats the musical instrument includes: in response to determining that the preset number of a current musical instrument and the preset number of a current limb of the robot meet a preset matching rule, the beaten position of the musical instrument and the joint configuration parameter of the limb of the robot at the moment when the robot beats the musical instrument are obtained, and the preset matching rule is determined based on a preset robot performance posture.

In a case that the robot plays a special musical instrument such as the drum set, the same limb of the robot needs to beat a variety of specified musical instruments, and the matching relationship is relatively complicated. The preset matching rule can be established by setting the preset numbers for each musical instrument and each limb of the robot, and the correction process described in the present disclosure can be started only when the preset number of the current musical instrument and the preset number of the current limb of the robot meet the preset matching rule.

For example, the preset matching rule is determined based on the preset robot performance posture. For example, a foot cymbal of the drum set can only be beaten by a left foot of the robot, a foot drum of the drum set needs to be beaten by a right foot of the robot, and the remaining four drums and three cymbals can be beaten by a left or right hand of the robot, so as to achieve the percussion performance.

Further, the joint of the current limb of the robot that meets the preset matching rule can be controlled to be in a zero gravity state until the joint configuration parameter of the limb of the robot is in a first preset range.

Specifically, the joint of the current limb of the robot that needs to be corrected can be in the zero gravity state through the real-time dynamics and the friction feedforward, which facilitates the user to drag the limb of the robot for beating the musical instrument to the beaten position. The first preset range can be determined according to a preset range of the joint configuration parameter when the limb of the robot is in the beaten position, i.e., when the limb of the robot moves to the approximate beaten position, the limb of the robot is fixed. In another example, the user can actively send a drag ending instruction to fix the limb of the robot.

The joint of the limb of the robot that does not currently meet the preset matching rule can also be locked, so as to avoid the influence of the current correction process on other limbs of the robot.

In an example, in a case that a duration when the joint configuration parameter of the limb of the robot is in the first preset range exceeds a preset duration (for example, 15 s), the beaten position of the musical instrument and the joint configuration parameter of the limb of the robot at the moment when the robot beats the musical instrument can be obtained, so as to ensure that the current limb of the robot remains static for a long time and is in a stable state to be corrected.

In another example, relevant parameters can be obtained when a preset instruction is received, so that the user can actively determine that the robot is in the stable state to be corrected after completing the dragging work of the limb of the robot.

Figure 3:
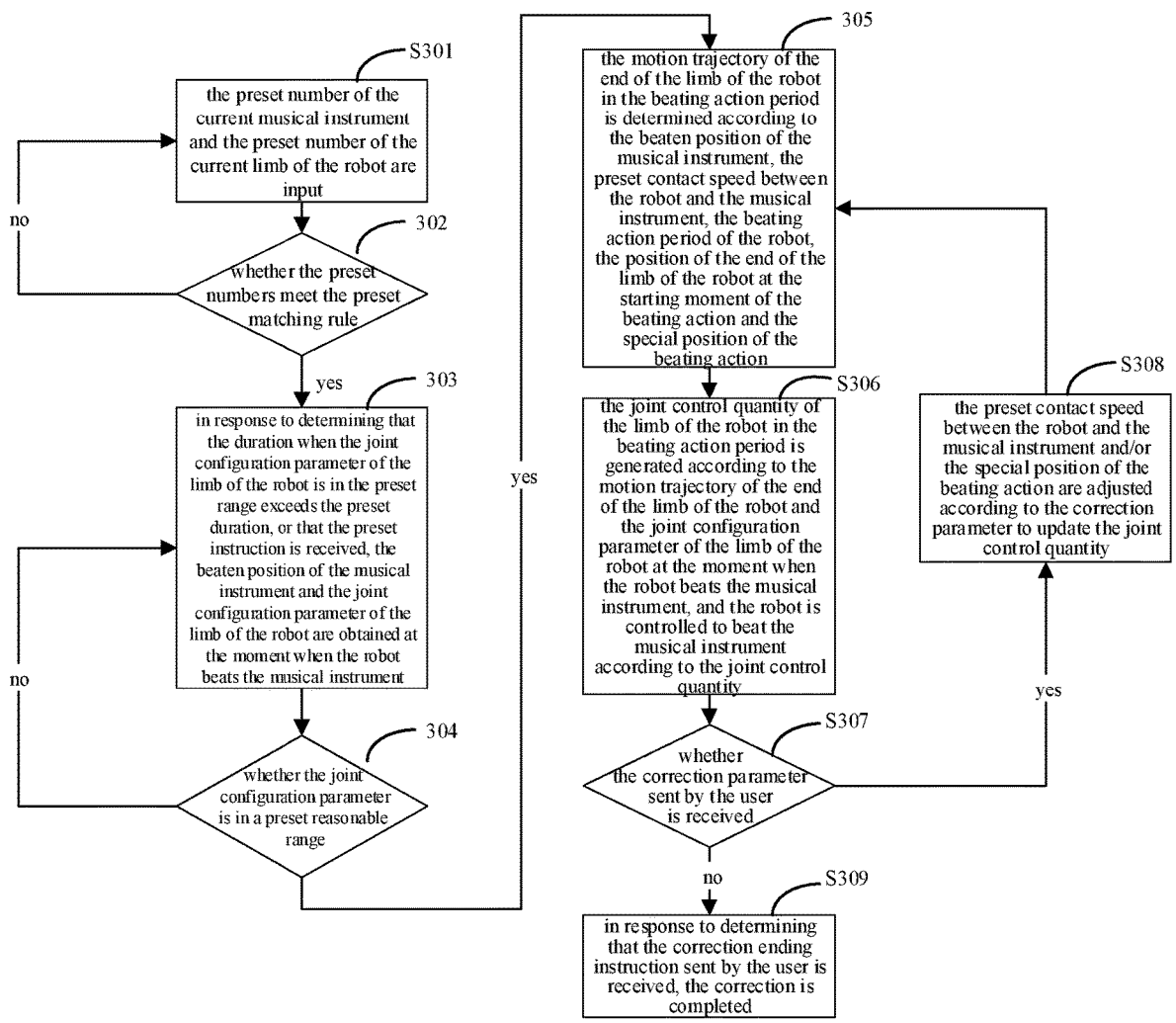
FIG. 3 is a flow chart of a robot control method according to another illustrative embodiment of the present disclosure.

FIG. 3 shows a flow chart of a robot control method according to another illustrative embodiment of the present disclosure.

At step S301, the preset number of the current musical instrument and the preset number of the current limb of the robot are input, and if it is determined at step S302 that the current numbers meet the preset matching rule, step S303 is executed.

At step S303, in response to determining that the duration when the joint configuration parameter of the limb of the robot is in the first preset range exceeds the preset duration, or that the preset instruction is received, the beaten position of the musical instrument and the joint configuration parameter of the limb of the robot at the moment when the robot beats the musical instrument are obtained. If it is determined at step S304 that the current joint configuration parameter is in a preset reasonable range, step S305 is executed.

At step S305, the motion trajectory of the end of the limb of the robot in the beating action period is determined according to the beaten position of the musical instrument, the preset contact speed between the robot and the musical instrument, the beating action period of the robot, the position of the end of the limb of the robot at the starting moment of the beating action period and the special position of the beating action.

At step S306, the joint control quantity of the limb of the robot in the beating action period is generated according to the motion trajectory of the end of the limb of the robot and the joint configuration parameter of the limb of the robot at the moment when the robot beats the musical instrument, and the robot is controlled to beat the musical instrument according to the joint control quantity.

At step S307, if the correction parameter sent by the user is received, at step S308, the preset contact speed between the robot and the musical instrument and/or the special position of the beating action are adjusted according to the correction parameter to update the joint control quantity, and the method returns to step S305.

At step S309, in response to determining that the correction ending instruction sent by the user is received, the correction is completed.

According to the solution disclosed by the present disclosure, the preset matching rule is established by setting the preset numbers for each musical instrument and each limb of the robot, so that the situation that the limb of the robot to be corrected does not match with the musical instrument is avoided. In addition, the joint of the current limb of the robot to be corrected is allowed to be in the zero gravity state through the real-time dynamics and the friction feedforward, which facilitates the user to drag the limb of the robot for beating the musical instrument to the beaten position. By locking the joint of the limb of the robot that does not currently meet the preset matching rule, the influence of the current correction process on other limbs of the robot can be avoided. Further, it can be actively or automatically determined that the robot is in the stable state to be corrected, so that the subsequent correction process can be started, and the accuracy of data collection of the sensor can be improved.

For the sake of simple description, all the aforementioned method embodiments are expressed as a series of action combinations, but those skilled in the art should know that the present disclosure is not limited by the described action sequence, because some steps can be performed in other sequences or simultaneously according to the present disclosure.

Further, those skilled in the art should also know that the embodiments described in the specification are all embodiments, and the actions and units involved are not necessarily essential for the present disclosure.

Corresponding to the aforementioned embodiments realizing the methods with applying the functions, the present disclosure also provides embodiments realizing a device and a corresponding terminal with applying the functions.

Figure 4:
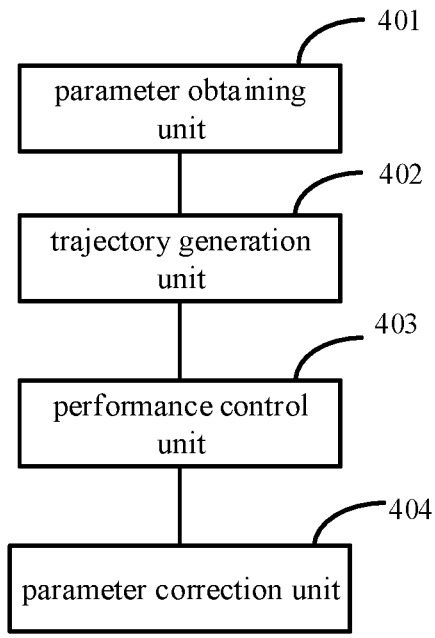
FIG. 4 is a block diagram of a robot control device according to an illustrative embodiment of the present disclosure.

FIG. 4 shows a block diagram of a robot control device according to an illustrative embodiment of the present disclosure. The robot achieves the performance effect by beating a musical instrument through limb movements. The device includes: a parameter obtaining unit 401 used to obtain a beaten position of the musical instrument and a joint configuration parameter of a limb of the robot at a moment when the robot beats the musical instrument; a trajectory generation unit 402 used to determine a motion trajectory of an end of the limb of the robot in a beating action period according to the beaten position of the musical instrument, a preset contact speed between the robot and the musical instrument, the beating action period of the robot, a position of the end of the limb of the robot at a starting moment of the beating action period and a special position of a beating action; a performance control unit 403 used to generate a joint control quantity of the limb of the robot in the beating action period according to the motion trajectory of the end of the limb of the robot and the joint configuration parameter of the limb of the robot at the moment when the robot beats the musical instrument, and to control the robot to beat the musical instrument according to the joint control quantity; and a parameter correction unit 404 used to, in response to determining that a correction parameter sent by a user is received, adjust the preset contact speed between the robot and the musical instrument and/or the special position of the beating action according to the correction parameter, to update the joint control quantity, and to control the robot to beat the musical instrument according to the updated joint control quantity until a correction ending instruction sent by the user is received.

In combination with any embodiment of the present disclosure, when the trajectory generation unit determines the motion trajectory of the end of the limb of the robot in the beating action period according to the beaten position of the musical instrument, the preset contact speed between the robot and the musical instrument, the beating action period of the robot, the position of the end of the limb of the robot at the starting moment of the beating action period and the special position of the beating action, the trajectory generation unit is specifically used to: determine a position control quantity of the end of the limb of the robot in the beating action period based on a first polynomial interpolation function; and determine a speed control quantity of the end of the limb of the robot in the beating action period based on a second polynomial interpolation function. Polynomial coefficients of the first polynomial interpolation function and the second polynomial interpolation function are determined through the beaten position of the musical instrument, the preset contact speed between the robot and the musical instrument, the beating action period of the robot, the position of the end of the limb of the robot at the starting moment of the beating action period and the special position of the beating action.

In combination with any embodiment of the present disclosure, when the performance control unit generates the joint control quantity of the limb of the robot in the beating action period according to the motion trajectory of the end of the limb of the robot and the joint configuration parameter of the limb of the robot at the moment when the robot beats the musical instrument, the performance control unit is specifically used to: determine the joint control quantity of the limb of the robot in the beating action period based on the Jacobian matrix according to the motion trajectory of the end of the limb of the robot and the joint configuration parameter of the limb of the robot at the moment when the robot beats the musical instrument.

In combination with any embodiment of the present disclosure, each musical instrument and each limb of the robot are provided with a preset number, and when the parameter obtaining unit obtains the beaten position of the musical instrument and the joint configuration parameter of the limb of the robot at the moment when the robot beats the musical instrument, the parameter obtaining unit is specifically used to: in response to determining that the preset number of a current musical instrument and the preset number of a current limb of the robot meet a preset matching rule, obtain the beaten position of the musical instrument and the joint configuration parameter of the limb of the robot at the moment when the robot beats the musical instrument. The preset matching rule is determined based on a preset robot performance posture.

In combination with any embodiment of the present disclosure, in the case that the preset number of the current musical instrument and the preset number of the current limb of the robot meet the preset matching rule, the device further includes a zero gravity control unit, which is used to control a joint of the current limb of the robot that meets the preset matching rule to be in a zero gravity state until the joint configuration parameter of the limb of the robot is in a first preset range.

In combination with any embodiment of the present disclosure, when the parameter obtaining unit obtains the beaten position of the musical instrument and the joint configuration parameter of the limb of the robot at the moment when the robot beats the musical instrument, the parameter obtaining unit is specifically used to: in response to determining that a duration when the joint configuration parameter of the limb of the robot is in the first preset range exceeds a preset duration, obtain the beaten position of the musical instrument and the joint configuration parameter of the limb of the robot at the moment when the robot beats the musical instrument; or in response to determining that a preset instruction is received, obtain the beaten position of the musical instrument and the joint configuration parameter of the limb of the robot at the moment when the robot beats the musical instrument.

In combination with any embodiment of the present disclosure, the device further includes a locking unit used to lock the joint of the limb of the robot that does not currently meet the preset matching rule at present.

In combination with any embodiment of the present disclosure, when the parameter obtaining unit obtains the beaten position of the musical instrument and the joint configuration parameter of the limb of the robot at the moment when the robot beats the musical instrument, the parameter obtaining unit is specifically used to determine an average value of the joint configuration parameters of the limb of the robot collected by a motion sensor within a preset duration as the joint configuration parameter of the limb of the robot.

For the device embodiments, since they substantially correspond to the method embodiments, reference can be to a corresponding part of the description of the method embodiments for the relevant part. The above embodiments of the device are only illustrative. The above units described as separate components may or may not be physically separated, and the components displayed as units may or may not be physical units, that is, they may be located in one place or distributed to multiple network units. Some or all of the units can be selected according to actual needs to achieve the purpose of the solution of the present disclosure, which can be understood and implemented by those ordinary skilled in the art without creative labor.

Figure 5:
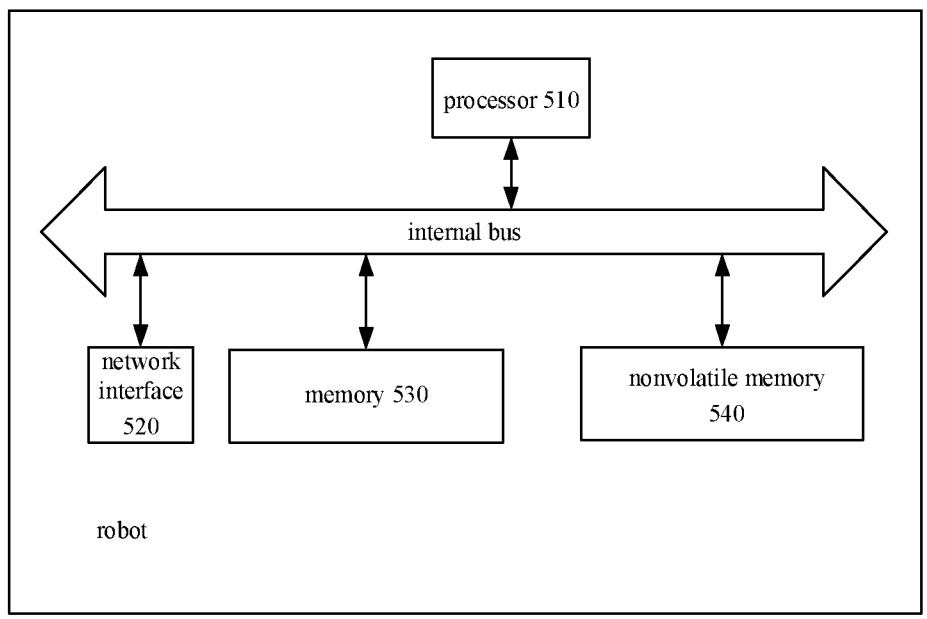
FIG. 5 is a block diagram of a robot according to an illustrative embodiment of the present disclosure.

Embodiments of the motion control device in this specification can be applied to computer equipment of the robot, such as a server or terminal equipment. The embodiment of the device can be realized by software, or by hardware or a combination of hardware and software. Taking the software implementation as an example, as a logical device, it is formed through reading the corresponding computer program instructions from the nonvolatile memory into the memory by its motion control processor. In terms of the hardware, FIG. 5 shows a hardware block diagram of the robot where the motion control device according to the embodiment of the present disclosure is. In addition to a processor 510, a memory 530, a network interface 520 and a nonvolatile memory 540 shown in FIG. 5, the server or electronic equipment where the device in the embodiment is may also include other hardware according to the actual functions of the computer equipment, which will not be described in detail here.

Other embodiments of the present disclosure will easily occur to those skilled in the art after considering the specification and practicing the disclosure disclosed herein. The present disclosure is intended to cover any variations, uses or adaptations of the present disclosure, which follow the general principles of the present disclosure and include the common sense or common technical means in the art that are not disclosed in the present disclosure. The specification and embodiments are to be regarded as illustrative only, and the true scope and spirit of the present disclosure are indicated by the following claims.

It should be understood that the present disclosure is not limited to the precise structure described above and shown in the drawings, and various modifications and changes can be made without departing from the scope of the present disclosure. The scope of the present disclosure is limited only by the appended claims.

What is claimed is:

1. A robot control method, a robot achieving a performing effect by beating a musical instrument through limbs movements, the method comprising:
   obtaining a beaten position of the musical instrument and a joint configuration parameter of a limb of the robot at a moment when the robot beats the musical instrument;
   determining a motion trajectory of an end of the limb of the robot in a beating action period according to the beaten position of the musical instrument, a preset contact speed between the robot and the musical instrument, the beating action period of the robot, a position of the end of the limb of the robot at a starting moment of the beating action period and a special position of a beating action, wherein the special position of the beating action is a position where the end of the limb of the robot is at a middle moment of the beating action period;
   generating a joint control quantity of the limb of the robot in the beating action period according to the motion trajectory of the end of the limb of the robot and the joint configuration parameter of the limb of the robot at the moment when the robot beats the musical instrument, and controlling the robot to beat the musical instrument according to the joint control quantity; and
   in response to determining that a correction parameter sent by a user is received, adjusting the preset contact speed between the robot and the musical instrument and/or the special position of the beating action according to the correction parameter, to update the joint control quantity, and controlling the robot to beat the musical instrument according to the updated joint control quantity;
   wherein determining the motion trajectory of the end of the limb of the robot in the beating action period according to the beaten position of the musical instrument, the preset contact speed between the robot and the musical instrument, the beaten action period of the robot, the position of the end of the limb of the robot at the starting moment of the beating action period and the special position of the beating action comprises:
   determining a position control quantity of the end of the limb of the robot in the beating action period based on a first polynomial interpolation function, and
   determining a speed control quantity of the end of the limb of the robot in the beating action period based on a second polynomial interpolation function;
   wherein polynomial coefficients of the first polynomial interpolation function and the second polynomial interpolation function are determined through the beaten position of the musical instrument, the preset contact speed between the robot and the musical instrument, the beating action period of the robot, the position of the end of the limb of the robot at the starting moment of the beating action period and the special position of the beating action.

2. The method according to claim 1, wherein generating the joint control quantity of the limb of the robot in the beating action period according to the motion trajectory of the end of the limb of the robot and the joint configuration parameter of the limb of the robot at a time when the robot beats the musical instrument comprises:
- based on a Jacobian matrix, determining the joint control quantity of the limb of the robot in the beating action period according to the motion trajectory of the end of the limb of the robot and the joint configuration parameter of the limb of the robot at the moment when the robot beats the musical instrument.

3. The method according to claim 1, wherein each musical instrument and each limb of the robot are provided with a preset number, and obtaining the beaten position of the musical instrument and the joint configuration parameter of the limb of the robot at the moment when the robot beats the musical instrument comprises:
- in response to determining that a preset number of a current musical instrument and the preset number of a current limb of the robot meet a preset matching rule, obtaining the beaten position of the musical instrument and the joint configuration parameter of the limb of the robot at the moment when the robot beats the musical instrument,
- wherein the preset matching rule is determined based on a preset robot performance posture.

4. The method according to claim 3, wherein in a case that the preset number of the current musical instrument and the preset number of the current limb of the robot meet the preset matching rule, the method further comprises:
- controlling a joint of the current limb of the robot that meets the preset matching rule to be in a zero gravity state until the joint configuration parameter of the limb of the robot is in a first preset range.

5. The method according to claim 4, wherein obtaining the beaten position of the musical instrument and the joint configuration parameter of the limb of the robot at the moment when the robot beats the musical instrument comprises at least one of:
- in response to determining that a duration when the joint configuration parameter of the limb of the robot is in the first preset range exceeds a preset duration, obtaining the beaten position of the musical instrument and the joint configuration parameter of the limb of the robot at the moment when the robot beats the musical instrument; or
- in response to determining that a preset instruction is received, obtaining the beaten position of the musical instrument and the joint configuration parameter of the limb of the robot at the moment when the robot beats the musical instrument.

6. The method according to claim 4, wherein the method further comprises:
- locking the joint of the limb of the robot that do not currently meet the preset matching rule.

7. The method according to claim 1, wherein obtaining the joint configuration parameter of the limb of the robot at the moment when the robot beats the musical instrument comprises:
- determining an average value of the joint configuration parameters of the limb of the robot collected by a motion sensor within a preset duration as the joint configuration parameter of the limb of the robot.

8. A robot, comprising:
a memory for storing instructions; and
a processor configured to:
- obtain a beaten position of a musical instrument and a joint configuration parameter of a limb of the robot at a moment when the robot beats the musical instrument;
- determine a motion trajectory of an end of the limb of the robot in a beating action period according to the beaten position of the musical instrument, a preset contact speed between the robot and the musical instrument, the beating action period of the robot, a position of the end of the limb of the robot at a starting moment of the beating action period and a special position of a beating action, wherein the special position of the beating action is a position where the end of the limb of the robot is at a middle moment of the beating action period;
- generate a joint control quantity of the limb of the robot in the beating action period according to the motion trajectory of the end of the limb of the robot and the joint configuration parameter of the limb of the robot at the moment when the robot beats the musical instrument, and control the robot to beat the musical instrument according to the joint control quantity; and
- in response to determining that a correction parameter sent by a user is received, adjust the preset contact speed between the robot and the musical instrument and/or the special position of the beating action according to the correction parameter, to update the joint control quantity, and control the robot to beat the musical instrument according to the updated joint control quantity;
wherein the processor is further configured to:
- based on a first polynomial interpolation function, determine a position control quantity of the end of the limb of the robot in the beating action period, and
- based on a second polynomial interpolation function, determine a speed control quantity of the end of the limb of the robot in the beating action period;
wherein polynomial coefficients of the first polynomial interpolation function and the second polynomial interpolation function are determined through the beaten position of the musical instrument, the preset contact speed between the robot and the musical instrument, the beating action period of the robot, the position of the end of the limb of the robot at the starting moment of the beating action period and the special position of the beating action.

9. The robot according to claim 8, wherein the processor is further configured to:
- based on a Jacobian matrix, determine the joint control quantity of the limb of the robot in the beating action period according to the motion trajectory of the end of the limb of the robot and the joint configuration parameter of the limb of the robot at the moment when the robot beats the musical instrument.

10. The robot according to claim 8, wherein each musical instrument and each limb of the robot are provided with a preset number, and the processor is further configured to:
- in response to determining that a preset number of a current musical instrument and the preset number of a current limb of the robot meet a preset matching rule, obtain the beaten position of the musical instrument and the joint configuration parameter of the limb of the robot at the moment when the robot beats the musical instrument, wherein the preset matching rule is determined based on a preset robot performance posture.

11. The robot according to claim 10, wherein in a case that the preset number of the current musical instrument and the preset number of the current limb of the robot meet the preset matching rule, the processor is further configured to:
control a joint of the current limb of the robot that meets the preset matching rule to be in a zero gravity state until the joint configuration parameter of the limb of the robot is in a first preset range.

12. The robot according to claim 11, wherein the processor is further configured to:
in response to determining that a duration when the joint configuration parameter of the limb of the robot is in the first preset range exceeds a preset duration, obtain the beaten position of the musical instrument and the joint configuration parameter of the limb of the robot at the moment when the robot beats the musical instrument.

13. The robot according to claim 11, wherein the processor is further configured to:
in response to determining that a preset instruction is received, obtain the beaten position of the musical instrument and the joint configuration parameter of the limb of the robot at the moment when the robot beats the musical instrument.

14. The robot according to claim 11, wherein the processor is further configured to:
lock the joint of the limb of the robot that do not currently meet the matching rule.

15. The robot according to claim 8, wherein the processor is further configured to:
determine an average value of the joint configuration parameters of the limb of the robot collected by a motion sensor within a preset duration as the joint configuration parameter of the limb of the robot.

16. A non-transitory computer-readable storage medium, on which a computer program is stored, the computer program is configured to, when executed by a processor, implement:
obtaining a beaten position of a musical instrument and a joint configuration parameter of a limb of the robot at a moment when a robot beats the musical instrument;
determining a motion trajectory of an end of the limb of the robot in a beating action period according to the beaten position of the musical instrument, a preset contact speed between the robot and the musical instrument, the beating action period of the robot, a position of the end of the limb of the robot at a starting moment of the beating action period and a special position of a beating action, wherein the special position of the beating action is a position where the end of the limb of the robot is at a middle moment of the beating action period;
generating a joint control quantity of the limb of the robot in the beating action period according to the motion trajectory of the end of the limb of the robot and the joint configuration parameter of the limb of the robot at the moment when the robot beats the musical instrument, and controlling the robot to beat the musical instrument according to the joint control quantity; and
in response to determining that a correction parameter sent by a user is received, adjusting the preset contact speed between the robot and the musical instrument and/or the special position of the beating action according to the correction parameter, to update the joint control quantity, and controlling the robot to beat the musical instrument according to the updated joint control quantity;
wherein determining the motion trajectory of the end of the limb of the robot in the beating action period according to the beaten position of the musical instrument, the preset contact speed between the robot and the musical instrument, the beaten action period of the robot, the position of the end of the limb of the robot at the starting moment of the beating action period and the special position of the beating action comprises:
determining a position control quantity of the end of the limb of the robot in the beating action period based on a first polynomial interpolation function, and
determining a speed control quantity of the end of the limb of the robot in the beating action period based on a second polynomial interpolation function;
wherein polynomial coefficients of the first polynomial interpolation function and the second polynomial interpolation function are determined through the beaten position of the musical instrument, the preset contact speed between the robot and the musical instrument, the beating action period of the robot, the position of the end of the limb of the robot at the starting moment of the beating action period and the special position of the beating action.

* * * * *